United States Patent [19]

Talbot

[11] 3,777,583
[45] Dec. 11, 1973

[54] CLUTCH

[75] Inventor: Jean-Guy Talbot, Valcourt, Quebec, Canada

[73] Assignee: Bombardier Limited, Valcourt, Quebec, Canada

[22] Filed: Mar. 31, 1972

[21] Appl. No.: 240,105

[30] Foreign Application Priority Data
Nov. 24, 1971 Canada.............................. 128477

[52] U.S. Cl........................................ 74/230.17 E
[51] Int. Cl............................................. F16h 55/22
[58] Field of Search............................ 74/230.17 E

[56] References Cited
UNITED STATES PATENTS

| | | | |
|---|---|---|---|
| 3,648,532 | 3/1972 | Vallieres..................... | 74/230.17 E |
| 2,986,043 | 5/1961 | Jaulmes........................ | 74/230.17 E |
| 3,665,781 | 5/1972 | Kawamura.................... | 74/230.17 E |
| 3,675,500 | 7/1972 | Albertson..................... | 74/230.17 E |

Primary Examiner—Leonard H. Gerin
Attorney—Christopher Robinson et al.

[57] ABSTRACT

The invention relates to power transmission mechanisms for vehicles, and is particularly directed to an improved centrifugal clutch designed for use in tracked vehicles, such as snowmobiles. According to the invention a clutch is provided having a drive shaft, a first flange mounted on the shaft for rotation therewith, a second flange displaceable on the shaft, the first and second flanges having opposed tapering surfaces co-acting to form a V-belt groove, and spring means are provided for urging the flanges apart. The improvement comprises a flyweight support mounted on the shaft at an end remote from the first flange for rotation therewith. Flyweights are pivotally mounted to the support, for engagement with the first and second spaced apart bearing surface respectively on the second flange, the center of gravity of the flyweights being located such that at a predetermined r.p.m. of the shaft, the flyweights will co-act with the first bearing surface to cause the axial displacement of the second flange, and the initial engagement of the clutch. Upon subsequent increase of shaft r.p.m., the flyweights co-act with the second bearing surface, causing a second, substantially lesser and controllable increase in axial displacement of the second flange. The purpose of the invention is to enable the vehicle to give initial power delivery to the gear train at the optimum torque or horsepower as may be desired.

7 Claims, 3 Drawing Figures

PATENTED DEC 11 1973

3,777,583

CLUTCH

BACKGROUND OF THE INVENTION

Field of The Invention

The invention relates to power transmission mechanisms for vehicles, and more particularly to a centrifugal clutch designed for use in tracked vehicles, for example snowmobiles.

There is a particular requirement in certain types of vehicles, especially those utilized for racing purposes, for an automatic clutch mechanism that will only engage with the vehicle drive arrangement at certain engine r.p.m. the purpose of such an arrangement being to enable the vehicle to give initial power delivery to the drive train at the optimum torque or H.P. as may be desired.

In the case of snowmobiles used for competition purpose, a standard form of clutch is unsuitable. What is necessary, is for the drive to be transmitted only when the engine power has built up to peak torque when the vehicle is stationary, the clutch being then engaged at full pressure. Apart from this requirement for the clutch to cut-in quickly there is a further requirement for subsequent control following clutch engagement.

SUMMERY OF THE INVENTION

The invention therefore provides a centrifugal clutch of the type having a drive shaft, a first flange mounted on said shaft for rotation therewith, a second flange displaceable on said shaft, said first and second flanges having opposed tapering surfaces coacting to form a V-belt groove, and spring means for urging said flanges apart, the improvement comprising: a flyweight support mounted on said shaft at an end remote from said first flange for rotation therewith, flyweights pivotally mounted to said support for engagement with first and second spaced apart bearing surfaces respectively on said second flange, the centre of gravity of said flyweights being located such that at a predetermined r.p.m. of said shaft said flyweights will co-act with said first bearing surface to cause a first axial displacement of said second flange and the initial engagement of said clutch, and, upon subsequent increase of shaft r.p.m., said flyweights co-act with said second bearing surface causing a second substantially lesser and controllable increase in axial displacement of said second flange.

One of the most important aspects of the present invention lies in the control of the clutch after initial cut-in at a predetermined r.p.m. This is achieved by means of a second roller or cam follower which is disposed inwardly from the first roller through which the initial displacing force is transmitted.

After the clutch has engaged, the flyweights or pressure levers of the governor assembly begin to engage these second mentioned rollers and leave the first rollers. The effect being that the force on the belt whilst still increasing with shaft r.p.m. does so at a lower rate and therefore controls clutch operation.

Further, the invention departs from previously known arrangements which have splined drive shafts by utilizing a smooth shaft. This considerably reduces the friction which previously occured in the region of the splines tending to cause the displaceable flange of the pully arrangement to bind in the closed position thus retarding the reaction of the governor.

BRIEF DESCRIPTION OF THE DISCLOSURE

The invention will now be described by way of example only, with reference to the accompanying drawings in which.

DESCRIPTION OF THE PREFERRED EMBODIMENT

Figure 1:
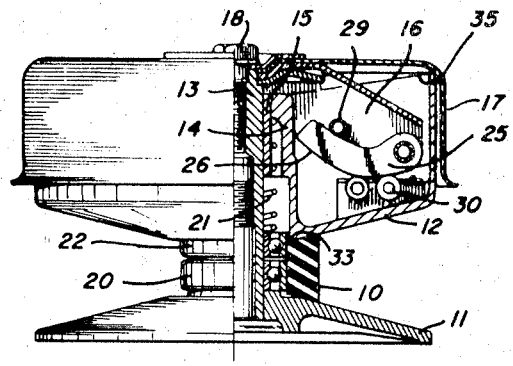
FIG. 1 is a sectional view of the clutch mechanism in an inoperative condition.

With reference to the drawings, the clutch according to the invention is shown in conjunction with a variable diameter driving pulley. Such pulley systems are common in variable speed power transmissions, the change in effective pulley diameter being obtained by the co-operation of a fixed inner flange 11 and axially movable outer flange 12 carried by a smooth, rotatable shaft 13. The flanges have opposed tapering surfaces which coact to form a V-shaped groove. In such a system a V-belt 10 is driven, the side edges of the belt being held between the pulley flanges. The movable flange 12 has a hub portion 14 extending away from the inner flange 11 and includes a sleeve member 15 which engages the outer surface of the shaft 13.

A centrifugal governor assembly 16 is mounted on the drive shaft 13 together with a governor guard 17 by means of a screw 18 and washer 19. The tightening of the screw into a threaded portion of shaft 13 serves to hold the mechanism in an assembled form which is then rotatable as a unit.

As can be seen in FIG. 1, bearings 20 and 22 are also included which provide a wide control bearing for supporting the displaceable flange and allow the drive shaft 13 to rotate during idling of the drive motor without rotating the drive belt 10. With this arrangement corner 33 of movable flange 12 remains in contact with at least one of bearings 20 or 22. This has the effect of increasing the effective length of hub portion 15 and greatly reducing the resistance to sliding thereof along shaft 13.

A spring 21 is also included, the spring 21 extending from bearing 22 to hub 14 on flange 12. The spring serves to hold the two flanges in maximum spaced position during idling or at low r.p.m.

In its preferred form, the centrifugal governor assembly 16 comprises a spider having four radially extending arms 23. As can be seen from the drawings these arms are formed to extend outwardly and downwardly from the central dish member 24 and shaft register 24(a) and cupped so that a pressure lever or flyweight 25 having a lower cam profiled surface 26, can be pivotally arranged within each arm 23 on pins 27, through shouldered bushings 28. A further stop 29 is included inside each arm 23 to limit the pivotal movement of the pressure lever in the upward direction.

Figure 2:
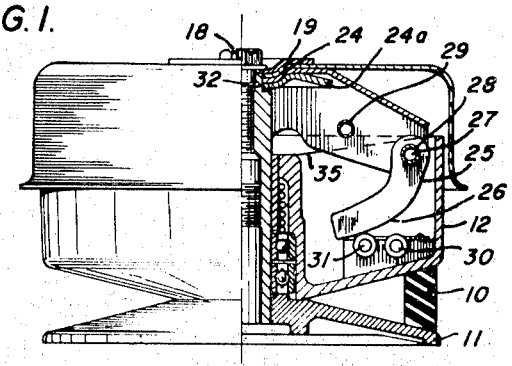
FIG. 2 is a similar view to that of FIG. 1 but showing the clutch in a fully operative condition.
Figure 3:
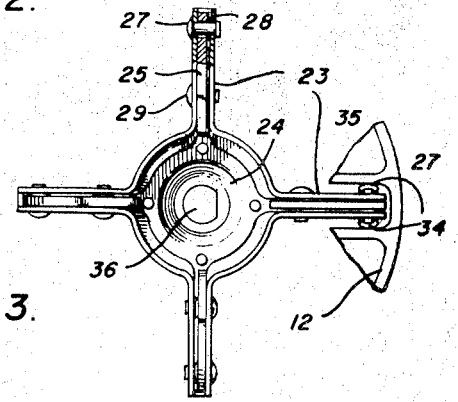
FIG. 3 is an underside view of the spider which supports the pressure levers within the clutch housing.

In addition, since the torque is transmitted to the movable flange through the spider, the central portion of the spider must be locked on shaft 13 by, for example, a spline or key arrangement. In FIG. 2, this is shown by providing a flat spot 32 on the shaft with a correspondingly shaped hole 36 in the central portion of the spider as shown in FIG. 3.

In its inoperative or idling condition the clutch components are in the position shown in FIG. 1. The pulley flanges are spaced apart, the spring 21 ensuring the flange 12 is kept in the open or spaced position. Each pressure lever is held in position by a cam follower (or roller) 30, which is fixedly mounted within the flange 12.

In operation, the centrifugal force created by the rotation of shaft 13 causes the pressure levers 25 to move inwardly about pin 27 towards flange 11. This pivotal movement of pressure lever 25 transmits bearing pressure on cam follower 30, and upon overcoming the force of the spring 21 causes the outer flange 12 to move toward a belt engaging position, as seen in FIG. 2. This pivotal movement of pressure lever 25 transmits bearing pressure on cam follower 30, and upon overcoming tbe force of the spring 21 causes the outer flange 12 to move toward a belt engaging position, as seen in FIG. 2.

In order to displace flange 12 only at a predetermined r.p.m., the counteracting force of spring 21 must first be overcome. By using pressure levers 25 which have a center of gravity only slightly inwardly of the line passing through pivot pin 27 normal to shaft 13, the pressure levers will be held in a static position until the centrifugal force is greater than the reaction spring 21. As soon as the reaction force of spring 21 is overcome, the pressure levers pivot about pin 27. The force exerted on the cam follower 30 is compounded as the center of gravity of the pressure lever 25 is displaced from its static or normal position relative to the pivotal axis. It will be appreciated that the effective "flyout" of the pressure levers 25 can be controlled by constructing them so as to have a centre of gravity relatively close or away from the pivotal axis. Similarly, the rate of displacement of flange 12 can be controlled by the surface profile of surface 26. The pressure levers 25 may be provided in sets having different characteriztics so that optimum performance ratio can be obtained by substituting one set for another.

However, after the machine has picked up speed, the rate of increase of pressure of the belt, which must initially be relatively high, should be reduced slightly to enable the engine to maintain peak performance. This is achieved by means of a second roller 31 which is disposed inwardly of the first roller 30 such that beyond a certain point the pressure levers begin to engage the inner rollers 31 transferring the bearing force of lever 25 to roller 31 from roller 30. The effect, of course, is that tbe pressure on the belt, although still increasing with the engine r.p.m., does so at a lower rate.

It is important that once the movable flange 12 has reached the position shown in FIG. 2, it should be free to return to an intermediate position upon release of the throttle control. This is achieved by mounting the hub of the movable flange 12 on a smooth shaft and by providing the spider shown in FIG. 3, with nylon caps 34 which slide along internal flanges 35. This has the effect of further allowing torque translation to flange 12 which otherwise would spin in smooth shaft 13. These caps 34 are shown fitted over the ends of the pins upon which the flyweights are pivotally secured, imprisoning the pivot pin and serving as wear surfaces with the internal flanges 35 of the moveable flange 12. The caps are simply slipped over the pins so that they can be removed for facilitating changes of the flyweights.

Whilst this arrangement is preferred, shaft 13 may of course be splined, however, as can be seen from the drawings, by utilizing flanges 35 within displaceable flange 12 to limit rotational displacement between governor assembly 16 cam follower 30 and flange 12, the same effect has been achieved.

What we claim as our invention is:

1. A centrifugal-clutch comprising: a drive shaft; a first flange mounted on said shaft for rotation therewith; a second flange mounted to be axially displaceable on said shaft; said first and second flanges having confronting conical surfaces which cooperate to form a V-belt groove; spring means associated with said shaft and operative to urge said flanges apart; a flyweight support mounted on said shaft for rotation therewith at an end remote from said first flange; a plurality of flyweights pivotally carried on said support at equal angular intervals about the axis of the shaft, each flyweight being pivotally movable to and from a retracted position wherein the centre of gravity of the flyweight lies close to the radial line extending at right angles to the shaft axis and the flyweight pivot axis; spaced first and second bearing surfaces carried by said second flange and registering with each said flyweight, said bearing surfaces being pressed by the action of said spring means such that said first bearing surfaces engage with the respective flyweights to urge the latter to the retracted position; each said flyweight having a cam surface for engaging said bearing surfaces, such that up to a predetermined speed of revolution of said clutch the force of said spring means is sufficient to hold said flyweights in the retracted position, whereas above said predetermined speed the centrifugal force developed in said flyweights applies an axial force to said first bearing surfaces to displace said second flange axially towards said first flange, said flyweights pivoting during said displacement whereby the centre of gravity of each flyweight moves axially progressively further from said radial line thereby to compound said axial force, said pivotal movement resulting in engagement of the cam surface of each flyweight with the respective second bearing surface which is spaced relatively further from the pivotal axis of the flyweight than said first bearing surface, whereby further increase in the speed of rotation produces an increase in the axial force applied to the second flange at a relatively lower rate.

2. A centrifugal clutch as claimed in claim 1 wherein said first and second bearing surfaces are radially spaced on support means carried on said second flange, said support means being located adjacent the conical surface of the second flange intermediate the inner and outer diameters thereof.

3. A centrifugal clutch as claimed in claim 2 wherein said flyweight support comprises a member keyed to said shaft, and having pairs of radially extending arms, said flyweights being pivotally mounted between respective pairs of said arms.

4. A centrifugal clutch as claimed in claim 3 wherein radial guide means are provided on said second flange for engagement with the ends of said arms, to guide said second flange during axial displacement thereof.

5. A centrifugal clutch as claimed in claim 5, wherein said flyweights are removably mounted within said pairs of arms on pins provided with wear resistant caps which co-act with said guide means and maintain said pins in position.

6. A centrifugal clutch as claimed in claim 1 wherein said first and second bearing surfaces comprise rollers mounted on said second flange on axes parallel to the pivotal axis of the corresponding flyweight.

7. A centrifugal clutch as claimed in claim 1 in combination with at least two sets of flyweights, the flyweights of each set having cam surfaces of different profile said sets being selectively incorporated in said clutch to selectively vary the characteristics thereof.

* * * * *